(12) United States Patent
Finley et al.

(10) Patent No.: US 12,099,117 B2
(45) Date of Patent: Sep. 24, 2024

(54) RADAR ICE CRYSTAL DETECTION THROUGH SINGLE BEAM INTEGRATION

(71) Applicant: Rockwell Collins, Inc., Cedar Rapids, IA (US)

(72) Inventors: Jeffery A. Finley, Cedar Rapids, IA (US); Venkata A. Sishtla, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 368 days.

(21) Appl. No.: 17/517,001

(22) Filed: Nov. 2, 2021

(65) Prior Publication Data

US 2023/0134507 A1    May 4, 2023

(51) Int. Cl.
G01S 13/42 (2006.01)
G01S 7/292 (2006.01)
G01S 13/95 (2006.01)
G08B 21/18 (2006.01)

(52) U.S. Cl.
CPC .......... *G01S 13/953* (2013.01); *G08B 21/182* (2013.01)

(58) Field of Classification Search
CPC ...... G01S 13/953; G01S 7/2922; G01S 13/42; G08B 21/182
USPC ....................................................... 342/26 B
See application file for complete search history.

(56) References Cited

U.S. PATENT DOCUMENTS

| 6,246,354 | B1 * | 6/2001 | Liedtke | G01V 3/12 342/22 |
| 10,494,108 | B1 * | 12/2019 | Finley | B64D 43/00 |
| 10,877,150 | B2 | 12/2020 | Badin et al. | |
| 2021/0132220 | A1 * | 5/2021 | Badin | G01S 13/953 |

OTHER PUBLICATIONS

Extended European Search Report dated Mar. 3, 2023 in European Application No. 222050389.5.

* cited by examiner

*Primary Examiner* — Vladimir Magloire
*Assistant Examiner* — Remash R Guyah
(74) *Attorney, Agent, or Firm* — Suiter Swantz IP

(57) ABSTRACT

A radar system executes an ice crystal detection method where filtered radar power returns with atmospheric ice concentration from a single beam are correlated. Filtered power returns from a typical radar pulse sequence are compared to detect high-altitude ice crystals. Individual, filtered pulses are correlated by bin.

14 Claims, 2 Drawing Sheets

RADAR ICE CRYSTAL DETECTION THROUGH SINGLE BEAM INTEGRATION

BACKGROUND

High altitude ice crystals are a threat to aircraft engines and pitot systems. Differentiation of ice crystals and ice crystal concentrations is very difficult. Pulsed radar detection involves transmission and reception of a sequence of pulses. Ground based radars differentiate ice crystals using dual polarimetric methods but multi-polarimetric radars are too heavy and expensive to field on commercial aircraft. It would be advantageous to have a system and method for identifying severe icing conditions

SUMMARY

In one aspect, embodiments of the inventive concepts disclosed herein are directed to a radar system and ice crystal detection method where filtered radar power returns with atmospheric ice concentration from a single beam are correlated. Filtered power returns from a typical radar pulse sequence are compared to detect high-altitude ice crystals.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
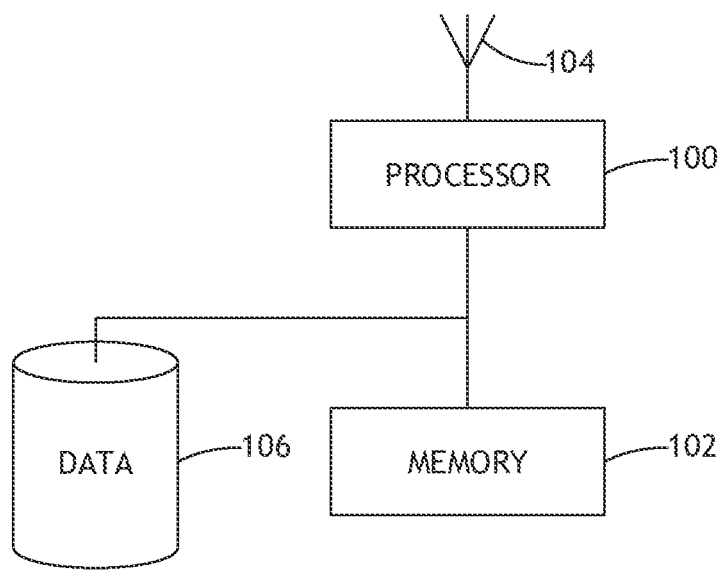
FIG. 1 shows a block diagram of a system useful for implementing exemplary embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radar system and ice crystal detection method where filtered radar power returns with atmospheric ice concentration from a single beam are correlated. Filtered power returns from a typical radar pulse sequence are compared to detect high-altitude ice crystals.

Referring to FIG. 1, a block diagram of a system useful for implementing exemplary embodiments is shown. The system includes a processor 100, memory 102 connected to the processor 100 for embodying processor executable code, and a radar antenna 104. The processor 100 electronically configures the antenna 104 to transmit a series of pulses. The pulses are sampled at various ranges (bins). Pulses are directed along a variety of azimuths (scan angle) and elevations (tilt angle) to create a complete weather picture around the aircraft. These pulses can be unmodulated pulses or can have some form of amplitude or phase modulation.

For each bin sampled, the processor 100 computes a raw power. In at least one embodiment, the processor then performs a log operation on the raw power of each return pulse to convert it into decibels.

$$\text{power}_{dB} = \log_{10}(\text{power}_{raw})$$

This power in decibels is then filtered to reduce noise and other unwanted echoes.

Ice crystal concentration can be estimated by application of specific filters to the power returns obtained from a sequence of pulses at a specific range bin from a single beam location. For example, ice concentration is proportional to:

$$\text{ice water content} = R(s) * K(s/(\tau * s + 1))$$

Where K and $\tau$ are variables dependent on air-temperature, altitude, pulse repetition rate, etc. The term s is the Laplace transform variable, and R(s) is the Laplace transform of the power returns obtained from a sequence of pulses at a specific range bin from a single beam location. This filter can be implemented as an analog or digital filter and the filter may be implemented as part of another radar process such as velocity and spectral width estimation. Other filters are envisioned. When the ice water content value exceeds a threshold consistent with an aircraft hazard, the crew is alerted to the location of the hazard based on the position of the beam and the sample range of the pulses.

Filtered values are associated with a corresponding bin and stored in a data storage device 106. In at least one embodiment, the washout filter in 0013 as a sequential filter that takes power values obtained by a sequence of radar return values at a given range bin and azimuth and pass them sequentially through the washout filter, producing an estimate of ice water content at that range bin. That estimate is passed through a threshold to high and moderate concentrations which may be displayed to the crew.

In at least one embodiment, the processor 100 may embody a trained neural network configured to receive the computer ice water content value and other environmental values to determine via a trained set of network layers if threshold metrics are exceeded.

Figure 2:
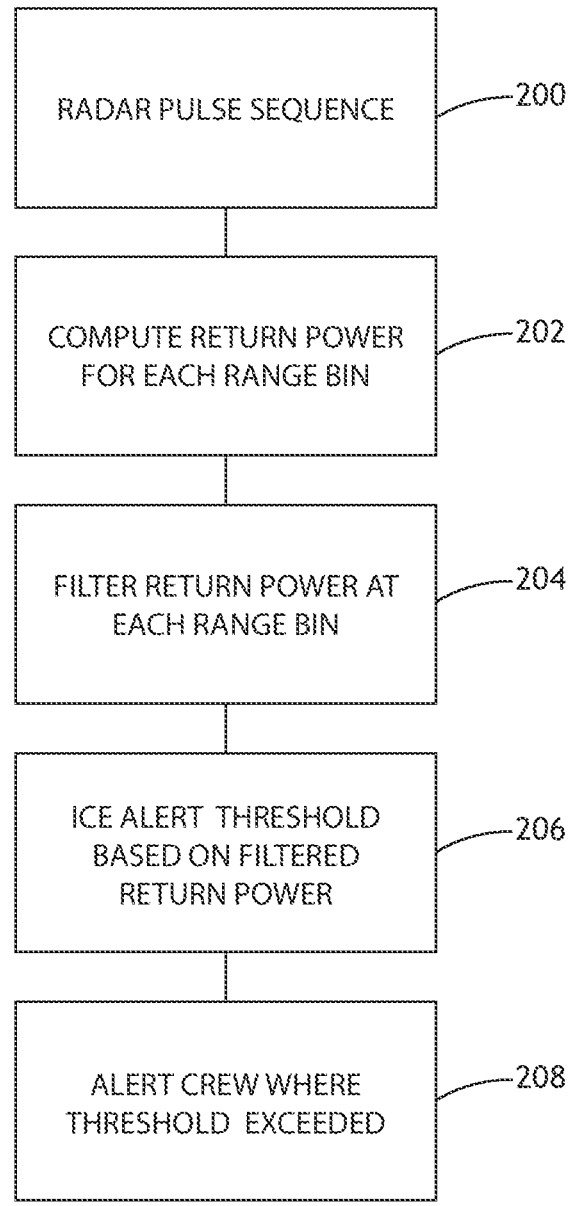
FIG. 2 shows a flowchart of a method for ice crystal detection according to an exemplary embodiment.

Referring to FIG. 2, a flowchart of a method for ice crystal detection according to an exemplary embodiment is shown. A radar system produces 200 a radar pulse sequence, each pulse having a specific elevation and azimuth. Return pulses are received and a raw power is computer 202 for each return pulse associated with a specific range bin; the raw power values may then be converted to power in decibels.

Return pulse power values are filtered 204 via a high-pass washout filter to compute ice crystal concentration. In at least one embodiment, filtration is also operative for noise removal, ground clutter suppression, sidelobe removal, velocity estimation, spectral width estimation, and spectral manipulation to remove beam-broadening terms, etc. Filters may consist of infinite impulse response (IIR) filters or finite impulse response filters (FIR) and may be implemented in analog or digital domains.

The filtered values are compared 206 to a threshold value and a crew warning issued 208 if the threshold is exceeded. In at least one embodiment, the filtered values may be stored and averaged with previous filtered values for each range bin. The average may define the threshold for that range bin.

Embodiments of the present disclosure enable single beam radar return data to be incoherently filtered with previously acquired data using air speed and drift angle to align the data. The resulting filtered data will be correlated with concentration of ice crystals using existing weather radar signal processing techniques to differentiate concentration of ice crystals.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one processor in data communication with a memory storing processor executable code for configuring the at least one processor to:
generate a plurality of radar pulses via a radar antenna, each associated with an elevation and azimuth;
receive return pulses for each of the plurality of radar pulses;
sample each return pulse at multiple ranges;
associate each return pulse sample with a range bin in a plurality of range bins;
compute a return power for each return pulse sample;
filter each return power via a washout filter configured as a sequential filter to produce an ice water concentration estimate for each range bin and azimuth;
compare each filtered return power to a threshold value indicating a threshold severity of icing; and
produce a crew warning when one or more filtered return power values exceeds the threshold value.

2. The computer apparatus of claim 1, wherein the at least one processor is further configured to convert the return power to decibels.

3. The computer apparatus of claim 1, wherein the filter comprises a high-pass filter.

4. The computer apparatus of claim 1, wherein the estimate is defined by a Laplace transformation of power returns from a sequence of pulses, and air-temperature, altitude, and pulse repetition rate.

5. The computer apparatus of claim 1, wherein:
the at least one processor is further configured to average filtered return power values for each range bin over time; and
the threshold value is defined by the average.

6. A method comprising:
generating a plurality of radar pulses via a radar antenna, each associated with an elevation and azimuth;
receiving return pulses for each of the plurality of radar pulses;
sampling each return pulse at multiple ranges;
associating each return pulse sample with a range bin in a plurality of range bins;
computing a return power for each return pulse sample;
filtering each return power via a washout filter configured as a sequential filter to produce an ice water concentration estimate for each range bin and azimuth;
comparing each filtered return power to a threshold value indicating a threshold severity of icing; and
producing a crew warning when one or more filtered return power values exceeds the threshold value.

7. The method of claim 6, further comprising converting the return power to decibels.

8. The method of claim 6, wherein the filter comprises a high-pass filter.

9. The method of claim 6, wherein the estimate is defined by a Laplace transformation of power returns from a sequence of pulses, and air-temperature, altitude, and pulse repetition rate.

10. The method of claim 6, further comprising average filtered return power values for each range bin over time, wherein the threshold value is defined by the average.

11. A radar system comprising:
a radar antenna; and
at least one processor in data communication with a memory storing processor executable code for configuring the at least one processor to:

generate a plurality of radar pulses via the radar antenna, each associated with an elevation and azimuth;
receive return pulses for each of the plurality of radar pulses;
sample each return pulse at multiple ranges;
associate each return pulse sample with a range bin in a plurality of range bins;
compute a return power for each return pulse sample;
filter each return power via a washout filter configured as a sequential filter to produce an ice water concentration estimate for each range bin and azimuth;
compare each filtered return power to a threshold value indicating a threshold severity of icing; and
produce a crew warning when one or more filtered return power values exceeds the threshold value.

12. The radar system of claim 11, wherein the at least one processor is further configured to convert the return power to decibels.

13. The radar system of claim 11, wherein the estimate is defined by a Laplace transformation of power returns from a sequence of pulses, and air-temperature, altitude, and pulse repetition rate.

14. The radar system of claim 11, wherein:
the at least one processor is further configured to average filtered return power values for each range bin over time; and
the threshold value is defined by the average.

* * * * *